US012519717B2

(12) United States Patent
Pande et al.

(10) Patent No.: US 12,519,717 B2
(45) Date of Patent: Jan. 6, 2026

(54) PACKET LOSS AND CONFIDENCE SCORES IN A DISTRIBUTED CONFIDENCE FABRIC

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 18/296,157

(22) Filed: Apr. 5, 2023

(65) Prior Publication Data

US 2024/0340235 A1 Oct. 10, 2024

(51) Int. Cl.
*H04L 45/302* (2022.01)
*H04L 45/28* (2022.01)

(52) U.S. Cl.
CPC .......... *H04L 45/3065* (2013.01); *H04L 45/28* (2013.01)

(58) Field of Classification Search
CPC ........................... H04L 45/3065; H04L 45/28
USPC ....................................................... 709/238
See application file for complete search history.

(56) References Cited

U.S. PATENT DOCUMENTS

| 7,539,869 | B1 | 5/2009 | Mullan et al. |
| 8,595,484 | B2 | 11/2013 | Thomas et al. |
| 10,757,111 | B1 | 8/2020 | Marek et al. |
| 10,986,076 | B1 | 4/2021 | Bendickson et al. |
| 11,544,253 | B2 | 1/2023 | Todd |
| 2005/0044356 | A1 | 2/2005 | Srivastava et al. |
| 2009/0144807 | A1 | 6/2009 | Zheng |
| 2010/0031027 | A1 | 2/2010 | Thomas et al. |
| 2014/0126573 | A1 | 5/2014 | Matthews et al. |
| 2015/0007271 | A1 | 1/2015 | Wong et al. |
| 2016/0191325 | A1 | 6/2016 | Pacella et al. |
| 2017/0310595 | A1 | 10/2017 | Avidar et al. |
| 2019/0036801 | A1 | 1/2019 | Natarajan et al. |
| 2020/0104527 | A1 | 4/2020 | Koster et al. |
| 2020/0233978 | A1 | 7/2020 | Sofia |
| 2020/0382560 | A1 | 12/2020 | Woolward et al. |

(Continued)

FOREIGN PATENT DOCUMENTS

WO 2023/043598 A1 3/2023

OTHER PUBLICATIONS

S. J. Patil al et., CLBNSRM—Confidence Level Based Unblend Neighbor Selection &Blend Node Report Based Optimized Route Formation in Manet, Mar. 2020, International Journal of Computer Networks & Communications (IJCNC) vol. 12, No. 2, pp. 109-129 (Year: 2020).*

(Continued)

*Primary Examiner* — Adil Ocak
(74) *Attorney, Agent, or Firm* — Workman Nydegger

(57) ABSTRACT

A data confidence fabric that is network topology aware is disclosed. When data is able to be transmitted over one of multiple communication channels, confidence information related to the transmission of the data over a selected communication channel is associated with the data. Events, such as failover, are also reflected in the confidence information and confidence score of the data. The confidence information and/or confidence scores allow applications to determine how to trust data in a manner that accounts for the transmission path.

20 Claims, 6 Drawing Sheets

(56) References Cited

U.S. PATENT DOCUMENTS

| | | | |
|---|---|---|---|
| 2021/0306256 A1 | 9/2021 | Ward et al. | |
| 2021/0328905 A1 | 10/2021 | Skalecki | |
| 2021/0406248 A1* | 12/2021 | Todd | G16Y 30/00 |
| 2022/0043721 A1* | 2/2022 | Shemer | G06F 11/1484 |
| 2022/0086781 A1 | 3/2022 | Kwon et al. | |
| 2022/0100858 A1 | 3/2022 | Todd | |
| 2022/0100879 A1 | 3/2022 | Todd et al. | |
| 2022/0138325 A1 | 5/2022 | Todd et al. | |
| 2023/0004913 A1* | 1/2023 | Reineke | G06Q 10/06393 |
| 2023/0077354 A1 | 3/2023 | Moon et al. | |
| 2023/0104424 A1 | 4/2023 | Diachina et al. | |
| 2023/0164174 A1 | 5/2023 | Heller et al. | |
| 2023/0247040 A1 | 8/2023 | Luttwak et al. | |
| 2024/0031376 A1 | 1/2024 | Lichtenstein et al. | |
| 2024/0235984 A1 | 7/2024 | Chunduri | |
| 2024/0329965 A1 | 10/2024 | Pande et al. | |
| 2024/0330040 A1 | 10/2024 | Pande et al. | |
| 2024/0333629 A1 | 10/2024 | Pande et al. | |

OTHER PUBLICATIONS

Dartois et al., "Tracking Application Fingerprint in a Trustless Cloud Environment for Sabotage Detection," IEEE, 2019, 9pg. (Year: 2019).

Priebe et al., "CloudSafetyNet: Detecting Data Leakage between Cloud Tenants," ACM, 2014, 12pg. (Year: 2014).

Todd, Steve, "Project Alvarium: The Future of Edge Data," Dell, 2020, 39pg. (Year: 2020).

Yao et al., "A trust management framework for software-defined network applications," Wiley, 2018, 18pg. (Year: 2018).

\* cited by examiner

PACKET LOSS AND CONFIDENCE SCORES IN A DISTRIBUTED CONFIDENCE FABRIC

RELATED APPLICATIONS

This application is related to U.S. Ser. No. 16/910,451, filed Jun. 24, 2020, and titled AUTOMATED DATA ROUTING IN A DATA CONFIDENCE FABRIC, which application is incorporated by reference in its entirety.

FIELD OF THE INVENTION

Embodiments of the present invention generally relate to data confidence fabric networks and data delivery in data confidence fabric networks. More particularly, at least some embodiments of the invention relate to systems, hardware, software, computer-readable media, and methods for time sensitive networking and confidence in data delivered via multiple or different paths or routes.

BACKGROUND

Computing and other electronic devices come in a variety of types and form factors and have varying capabilities. Many of these devices generate data that may be used by various applications. There is often a question, however, about the value of the data or the confidence that an application can place in the data. In other words, applications benefit from using data in which there is high confidence. Applications that execute using data associated with high confidence levels typically generate more reliable results and outputs. Applications also benefit from data that is delivered quickly, particularly when the applications are time sensitive. Applications may also be concerned with the manner or path over which the data is delivered.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
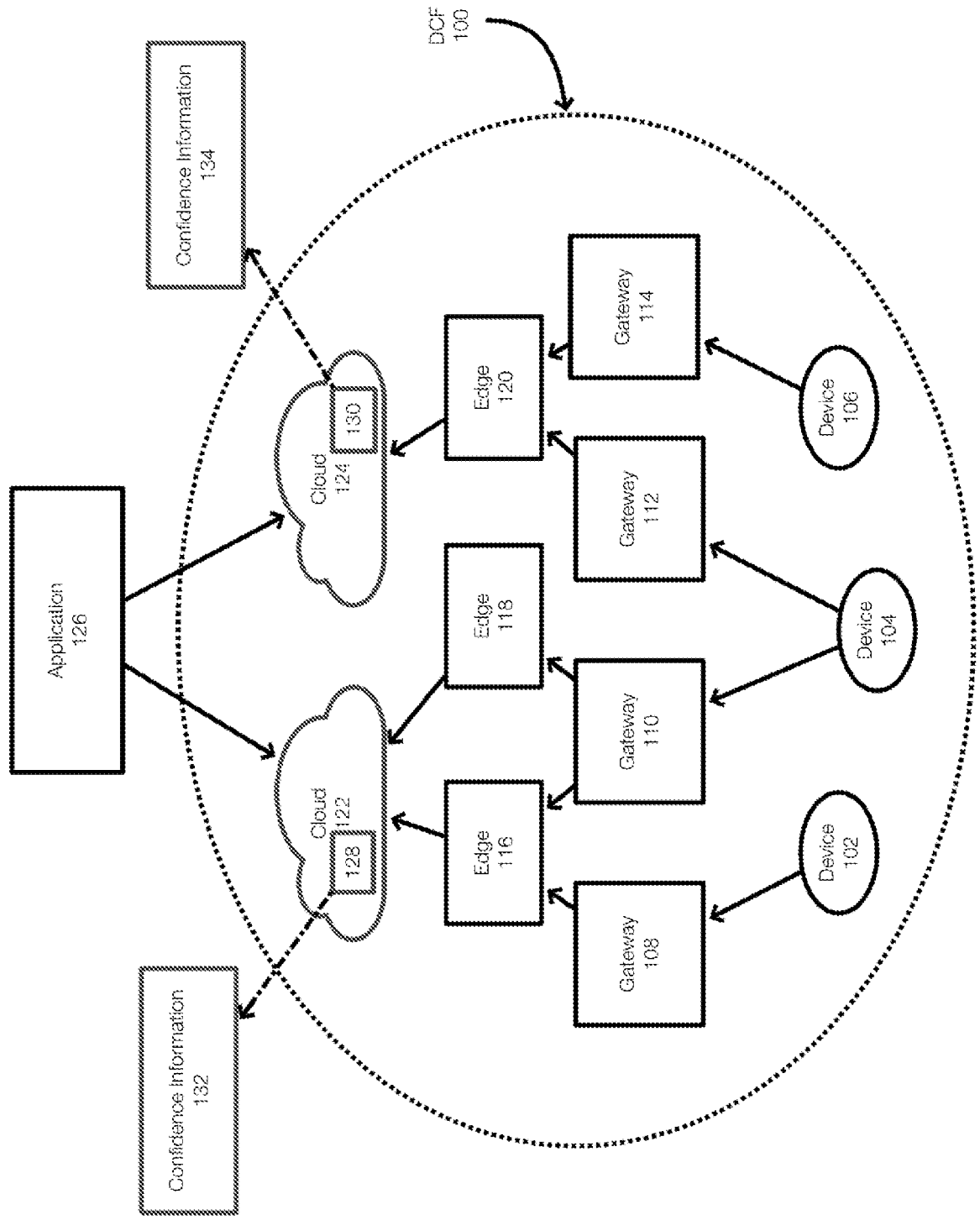
FIG. 1 discloses aspects of a computing system such as a data confidence fabric network.

Embodiments of the present invention generally relate to computing systems or ecosystems such as data confidence fabrics (DCFs). In one example, a DCF is a system or network of hardware (e.g., computers, servers, routers, network interface cards, storage including immutable storage and/or other hardware) that is provisioned (e.g., with software, services) to score or rank data that may be ingested into and/or transmitted through the DCF. Communications in a DCF may include wired (e.g., ethernet) and/or wireless communications. The data ingested into the DCF can be made available to applications, which may also be part of the DCF. The applications can leverage the confidence scores of the data.

A DCF is generally configured to add confidence information to data. The confidence information can take various forms including a confidence score and associated metadata or annotations. The confidence information can be added from a hardware perspective and/or a software perspective.

Embodiments of the invention relate to DCF configurations in which data or packet routing is considered. More specifically, embodiments of the invention relate to DCF configurations in which a communication channel may failover to another communication channel. Confidence in the data may be impacted when data being transmitted over one communication channel is switched to a different communication channel. The ability to deliver data over a particular communication channel or over multiple channels due to failover or for other reasons can be reflected in the confidence information. Embodiments of the invention relate to generating confidence information in the context of communication channels that can be associated with data transmitted over those communication channels. Failover, for example, may cause a confidence score to decrease.

The change in the confidence score may also be impacted based on other characteristics of the communication channels. Communication channels may have various characteristics such as bandwidth, auto failover, VPN (virtual private network) capabilities, class of service, performance metrics, or the like. Because the characteristics of one communication channel may differ from the characteristics of another communication channel, failing over can impact the confidence score based on the failover itself and the characteristics of the communication channel.

MPLS (Multiprotocol Label Switching) is a protocol or method for routing data. For example, an edge environment may connect with a datacenter or other system using a connection such as MPLS that may be provided by an Internet Service Provider (ISP). The edge environment may have multiple ISPs and multiple MPLS systems. Embodiments of the invention are not limited to MPLS configurations. An ISP connection is an example of a communication channel.

For example, an edge site or system may connect to a datacenter or application or system (e.g., a Saas (Software as a Service) system) using multiple ISP connections. The first ISP connection may be a primary ISP connection and the second ISP connection may be used as a backup ISP connection. If failure or data loss occurs on the first ISP connection, the edge site may switch to the second ISP connection. The SaaS system, however, may not see an interruption or be aware of the failover. However, the first and second ISP connections may not be associated with the same level of trust and may not contribute equally to confidence scores.

Embodiments of the invention integrate confidence scores with packet routing or packet rerouting logic such that the data being transmitted includes confidence information related to the ISP connection that reflects events such as failover, transmission delay, packet loss, or the like. This allows the application using the data (the SaaS in one example) to determine whether or how much to trust the data because the confidence score of the data will reflect the ISP connection or, more generally, the communication channel. More specifically, the confidence score will reflect events such as failover and the characteristics of the ISP connection. Consequently, the confidence score of data transmitted over the first ISP connection may be different from the confidence score of the data transmitted over the second ISP. The confidence information may also reflect the fact that a failover occurred from the first ISP to the second ISP or vice-versa.

A DCF, by way of example only, may be an architecture and set of services that allow data to be ingested and used by applications. The DCF may include trust insertion technologies (hardware and/or software) that are applied to the data as the data flows through the DCF. The selection and use of a communication channel such as an ISP connection may be viewed as a trust insertion technology.

Each time a trust insertion technology is applied, an annotation may be made in a ledger or other structure and the confidence score may be changed. Thus, the confidence score of data provides a view into the trustworthiness of the data to an application. Trust or confidence information can be added from both hardware and software perspectives. Data may be associated with an overall confidence score. In addition, a confidence score may be generated for each trust insertion technology. This allows an application, for example, to evaluate how to trust the data in the context of a specific trust insertion technology, such as communication channel selection/use.

A DCF may include various interconnected hardware environments (e.g., nodes). These nodes may have varying hardware capabilities that are examples of trust insertion technologies or hardware-assisted trust insertion technologies. The hardware is configured such that as data flows from data sources to storage or to applications in a DCF system, scores can be attached to or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The confidence information, which may include a confidence score or rank, is made available to one or more applications or other clients or users. The confidence information may include, in addition to a confidence score and/or rank, tables, audit information, and the like.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

For example, an application operating in a nuclear facility may need to use data that is very trustworthy (have a high confidence score) while data that is used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof. The path or communication channel used to deliver data have importance and may contribute to confidence score of the data. Applying these trust insertion technologies improves the confidence score of data.

The confidence an application has in data may be related to the manner in which the data was handled and/or delivered. An application may have more confidence in data that arrives over trusted communication channels. ISP or MPLS lines may be equally capable of delivering data from a source to a target (e.g., an edge system to an SaaS system). The SaaS system may be interested in understanding that data may have been transmitted using multiple lines or communication channels and may be interested in packet loss failure/recovery situations. For instance, the confidence of an application in data delivered over multiple communication channels in which packet loss/failure/recovery occurred may impact the confidence the application has in the data. Embodiments of the invention thus relate to providing confidence scores in the context of communication channels and data routing decisions or logic.

FIG. 1 illustrates an example of a data confidence fabric network (DCF 100). The DCF 100 includes varies computing and hardware components, connections, and environments. The DCF 100 is configured to add confidence information including confidence scores to data flowing in the DCF 100.

FIG. 1 illustrates examples of data routes or paths in the DCF 100. A specific path of specific data may be referred to as a graph. In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add confidence information to the data. After flowing through the DCF 100, the data 128 (which may have been generated by one of the devices 102, 104, and/or 106) is stored in the cloud 122 and made available to an application 126. Similarly, the data 130 may be made available to the application 126. Alternatively, the data 128 and 130 are delivered directly to the application 126. The data 128 is associated with confidence information 132 and the data 130 is associated with confidence information 134. The confidence information 132 and 134 may include confidence scores, provenance data, audit trails, data graphs, applied trust insertion technologies, or the like.

Data flowing through a DCF is typically more valuable and useful at least because the confidence scores or ranks of DCF annotated data allow an application to decide how to trust and/or use the associated data. For any given path, a node may have the ability to select from among multiple communication channels. Annotations may be generated to reflect the communication channel selected and/or characteristics of the selected communication channel and/or reasons for selecting a particular communication channel (e.g., by choice or due to failover).

Figure 2:
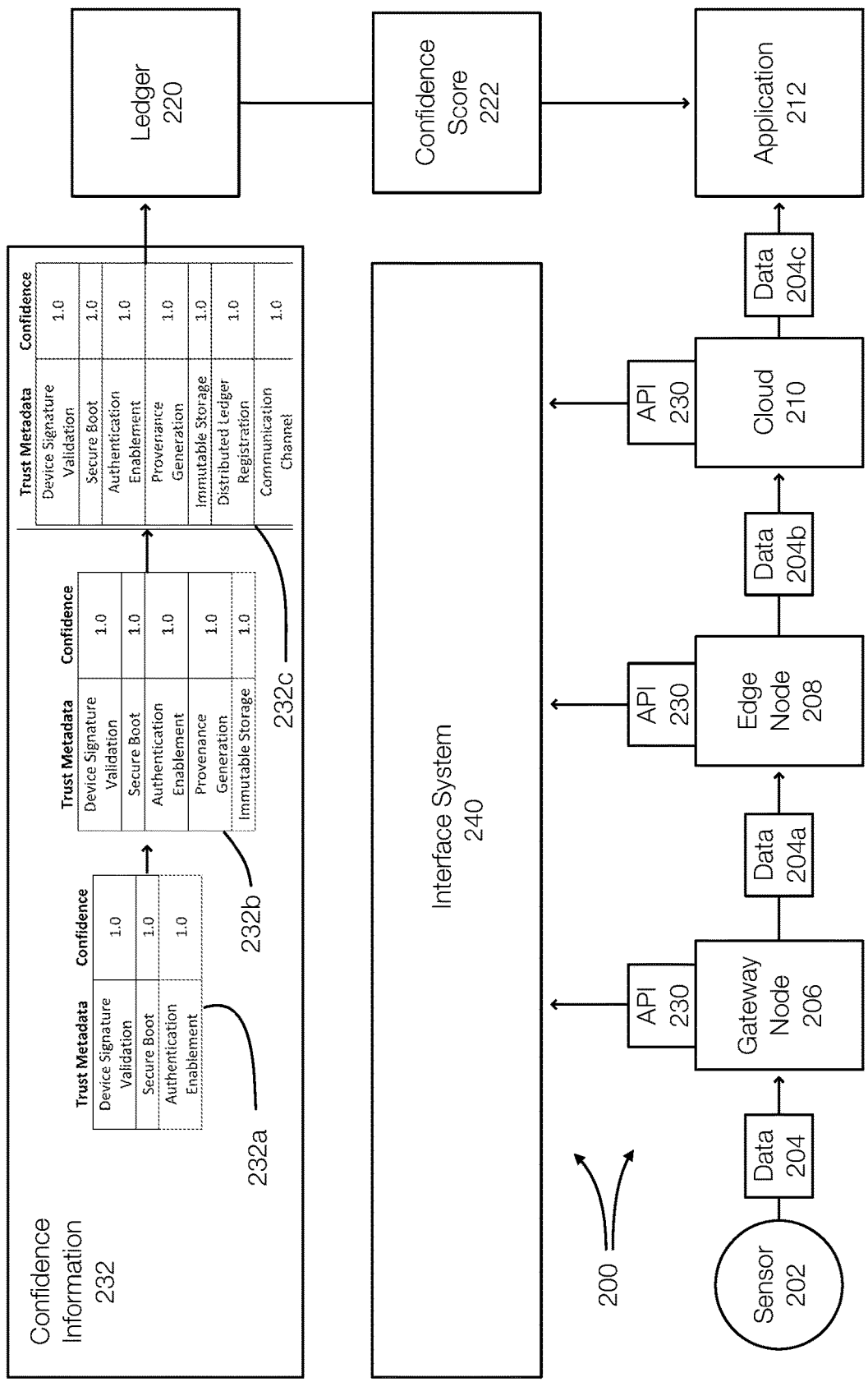
FIG. 2 discloses additional aspects of a computing system such as a data confidence fabric network.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 is generated and accompanies the data 204 as the data 204 is routed in the DCF 200. At the gateway node 206, for example, the data 204 is annotated with confidence information 232*a*, which relates to trust insertion technologies such as a device signature validation, a secure boot, and an authentication enablement. Each of these trust insertion technologies, in this example, are performed and add a score that is reflected in the confidence information 232*a*. More specifically, the gateway node 206 may access an interface system 240 using an application programming interface (API) 230, which is an example of a DCF driver, to record the confidence information 232*a*. The data 204 and the annotations or confidence information may be transmitted together or maintained separately.

Next, the data 204*a* (which is the annotated data 204 after passing through the gateway node 206) is routed to an edge node 208 and additional confidence information is added as reflected in the confidence information 232*b*. Thus, the data 204*a* arrives at the edge node 208 and is already associated with the confidence information 232*a*. The edge node 208 may add apply additional trust insertion technologies such as provenance generation and immutable storage. These trust insertion technologies allow the confidence information to be augmented as illustrated by the confidence information 232*b*. Thus, the data 204*b* leaving the edge node 208 is associated with the confidence information 232*b*.

Next, the data 204*b* arrives at the cloud 210 and additional confidence information is added as illustrated by the confidence information 232*c*. Thus, the cloud 210 may apply or use a trust insertion technology such as distributed ledger registration and the confidence information 232 is updated as shown by the confidence information 232*c*.

In one example, the confidence information 232 is stored in a ledger 220. As a result, the confidence information 232 is secure and can be accessed by an application 212. In this example, the data 204 arrives at the application 212 as the annotated data 204*c*, which is associated with the confidence information 232*c* and with a confidence score of, in this example, 7.0. In this example, the confidence information 232*c* includes confidence information related to the communication channel and the associated score of 1.0 may reflect that the selection, performance, and operation of a selected communication channel was as expected and used to deliver the data 204*c*. The application 212 thus has insight into the trustworthiness of the data 204 generated at the sensor 202 and has insight into the communication channel.

The confidence score can be generated in different ways. The various trust insertion technologies may be weighted or have different scores. For example, the DCF 200 may be associated with a maximum confidence score (e.g., 10). If the data 204 had followed a different route in the DCF 200, the confidence score may be different. For example, other nodes may have trust insertion technologies that could have increased the confidence score of the data 204. Different routes may also result in lower confidence scores.

Embodiments of the invention relate to routing data in a DCF such as the DCF 100 or the DCF 200. However, the routing may be performed in a manner that accounts for characteristics of the route or based on communication channel selection. For example, a route for data may be based on one or more of trust capabilities (e.g., trust insertion technologies) per route in an attempt to maximize the confidence score, based on the resource availability of the nodes in the available or potential routes, delivery requirements, and on historical data (e.g., average or expected delivery times) associated with specific routes in the DCF 200. Trust capabilities, resource availability, and/or delivery times can be used or combined in different manners in order to select a route or path for the data. Thus, the data is routed in a manner that accounts for trust capabilities, speed of delivery, and/or historical outcomes.

Further, the route or path of data may employ time sensitive networking or include time sensitive portions. The confidence information thus includes confidence information (e.g., annotations) related to the time sensitive aspects of the network or data path. The confidence information also includes confidence information that relates to operation/selection of a communication channel.

Figure 3:
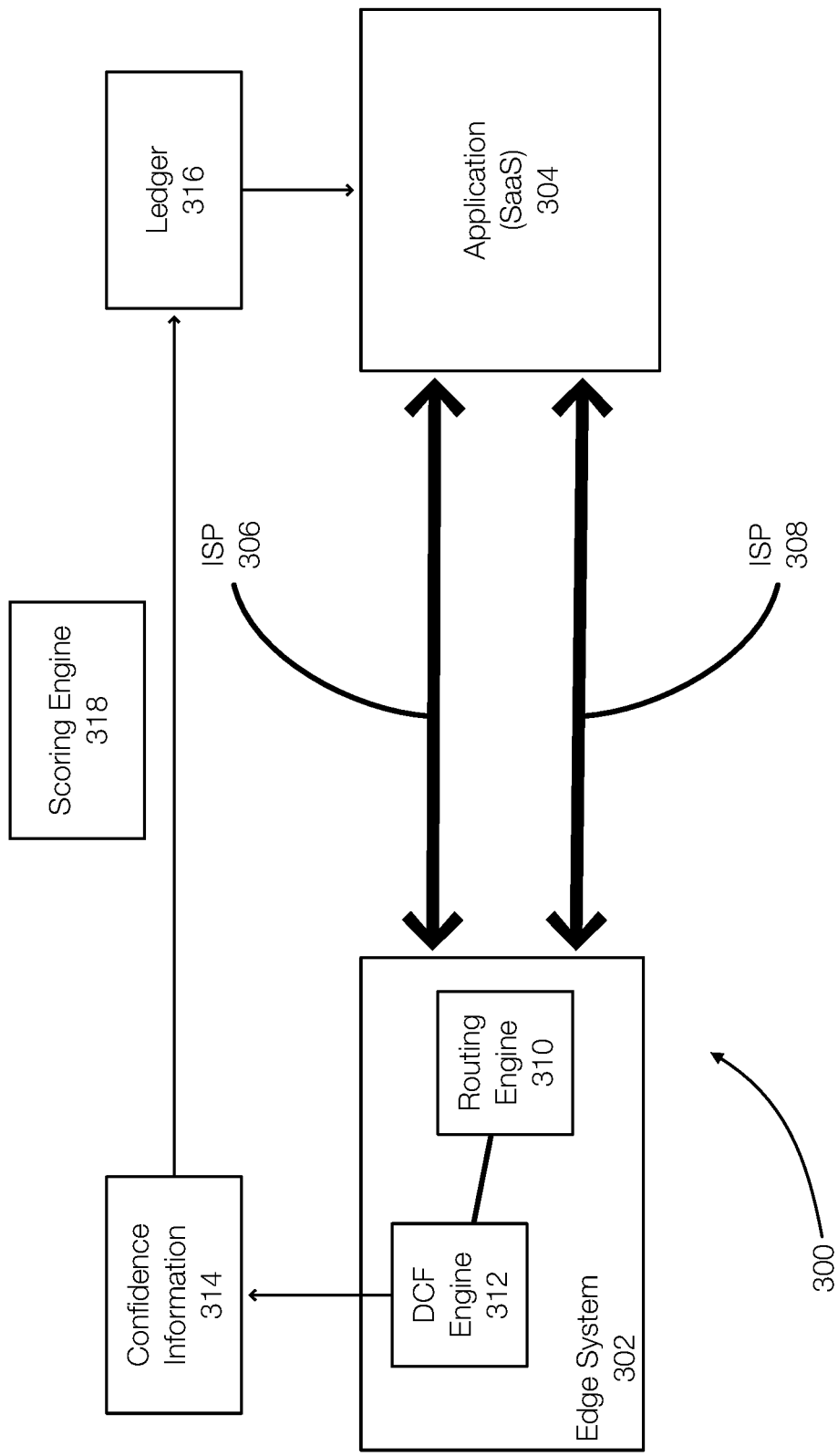
FIG. 3 discloses aspects of annotating data in a data confidence fabric in the context of communication channels.

FIG. 3 discloses aspects of annotating data. FIG. 3 illustrates an edge system 302 (e.g., a node of an edge system) configured to communicate with an application 304 (or datacenter), which may be located in a datacenter remote from the edge system 302. The edge system 302 is capable of communicating over an ISP 306 or an ISP 308. The edge system 302 may include a routing engine 310 configured to determine how data (e.g., over which ISP) data/packets are transmitted to the application 304.

In one example, the ISP 306 may be a primary path. However, if issues arise (e.g., packet loss, congestion), the routing engine 310 may switch transmissions or failover to the ISP 308. More specifically, the routing engine 310 is configured to reroute data/packets when data transmissions fail for any reason. The routing engine 310 can perform failover from one ISP to another ISP.

The DCF engine 312, which may be a DCF driver, is configured to interface or integrate with the routing engine 310. The DCF engine 312 becomes aware of how data/packets are transmitted and which ISP is used for the transmission. More specifically, the Routing engine 310 may communicate information about the routing to the DCF engine 312.

The DCF engine 312 then generates confidence information 314 associated with the transmission. The confidence information 314 is stored in a ledger 316 and may be accessed or received by the application 304. This allows the application 304 to access and assess the confidence information 314 and make decisions regarding the corresponding data. For example, each data or each packet may be associated with confidence information.

The confidence information may include a confidence score. A scoring engine 318, which may be implemented at the edge system 302 and/or at another location in the DCF 300 may be configured to generate a confidence score for the data being transmitted. For example, the scoring engine 318 may use the confidence information, such as annotations, to determine a score or a portion of a confidence score related to transmitting the data.

For example, the ISP 308 may be associated with or include trust insertion technologies that the ISP 306 does not have. As such, the scoring engine 318 may generate or determine a higher confidence score for data transmitted over the ISP 308. If the ISP 308 fails, the confidence score may be impacted in a negative manner. The annotations (e.g., failover occurred, or packets lost, or packets delayed) may be used to determine a confidence score for the data. Similarly, the routing engine 310 may switch from the ISP 306 to the ISP 308 to take advantage of the additional characteristics to improve the confidence score of the data.

Figure 4:
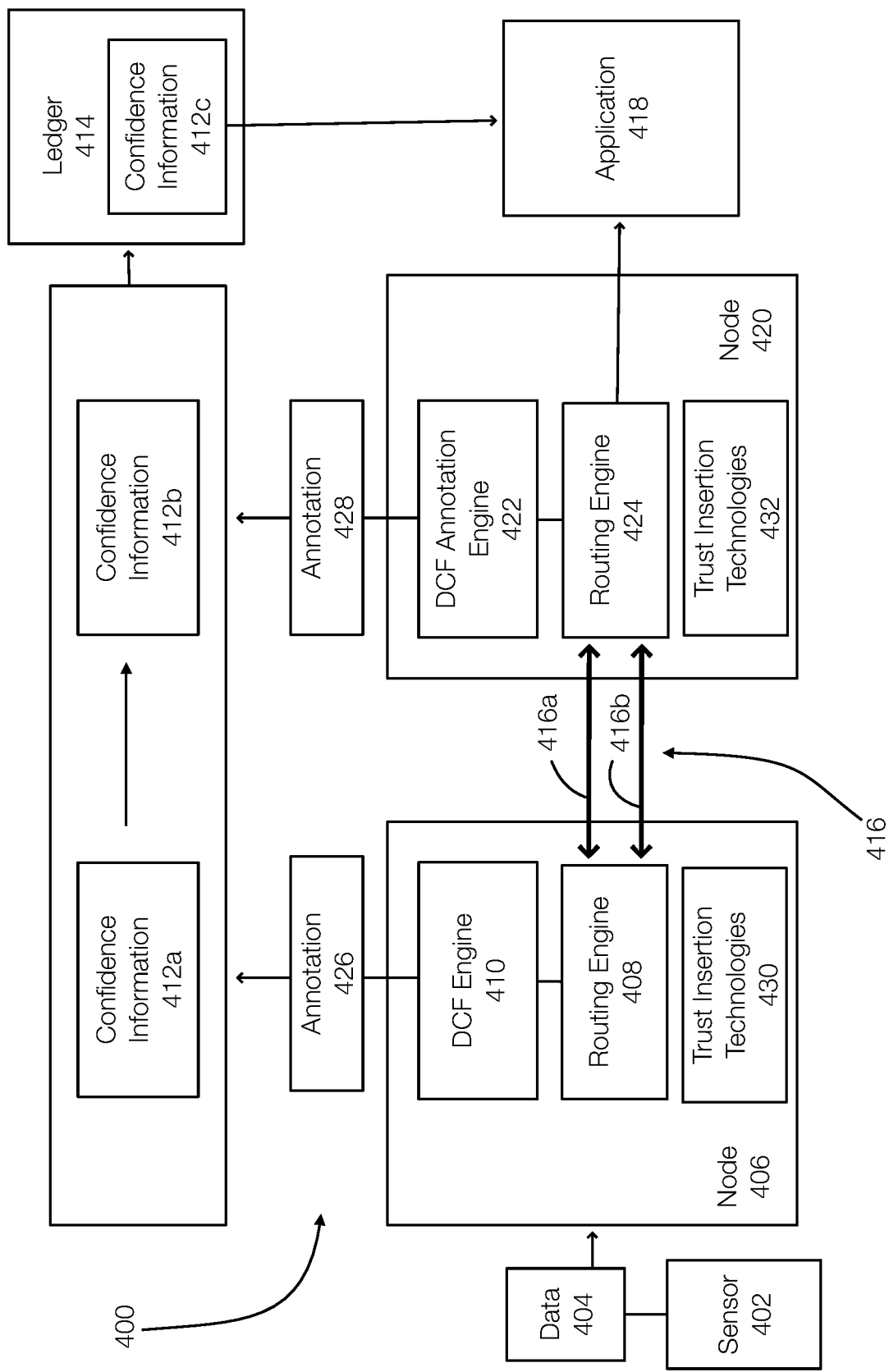
FIG. 4 discloses additional aspects of confidence information and confidence scores based in part on communication channel considerations.

FIG. 4 discloses aspects of confidence information and confidence scores based in part routing or based in part on the selection an use of communication channels. FIG. 4 illustrates a sensor 402 that generates data 404 (e.g., specific data, a data stream, or the like) that may be ingested into a data confidence fabric 400. A type of the data 404 may depend on the sensor 402. Thus, the data 404 may be audio/video data, temperature data, position data, weather data, motion sensor data, temperature data, or the like.

The node 406, in this example, is an ingestion node 406 or the first node to touch or process the data 404 and may be located, for example, at an edge site. The node 406 may include trust insertion technologies 430. The trust insertion technologies 430 may process or operate on the data 404. Further, the routing engine 408 may operate on the data 404 and may be viewed as an example of a trust insertion technology. More specifically, the routing engine 408 may determine the communication channel for the data and/or manage the communication channel in the event of data loss, congestion, failover, or the like.

The DCF engine 410 (e.g., a driver) operates to generate an annotation 426 for the data 404. The annotation 426 is added to confidence information 412a. In one example, the annotation 426 includes annotations related to the trust insertion technologies 430. The annotation 426 may also include an annotation such as "data delivered over ISP 1" using the routing engine 408. The annotation 426 may indicate that "switch transmission to ISP 2 during failover". The annotation 426 thus includes aspects of the communication channels and/or the communication channel used to transmit the data 404 that may be of interest to the application 418.

Thus, the annotation 426 may include confidence information regarding the routing engine 408 and/or the communication channels 416. The annotation 426 may include information about the configuration of the routing engine 408, the protocol of the routing engine 408, which of the communication channels 416 (e.g., ISP 416a or ISP 416b) is selected for transmitting data/packets, failover occurrences, or the like. The annotation 426 is included in the confidence information 412a and may contribute to the confidence score associated with the data 404.

The data 404 is then transmitted over the selected ISP to a node 420. In this example, the node 420 may represent the next hop in the route or path or an end node of the path 416. The communication channels 416 (e.g., ISPs 416a and 416b) represent a connection between the node 406 and the node 420. In this example, the node 420 may be a SaaS system that includes an application 418.

The data 404 is received at the node 420 or by the routing engine 424. Trust insertion technologies 432 of the node 420 may be applied at the node 420.

Once the data 404 is received at the node 420, the DCF engine 422 may update the confidence information 412a to the confidence information 412b. The confidence information 412b may include an annotation 428 related to the routing engine 424 and/or the ISP used for transmission. For example, the annotation 428 may include "received data over ISP 416a because of failover".

The confidence score may be adjusted based on performance of ISP 416a or other characteristics of the ISP 416a or based on the annotation or based on the fact that failover occurred. If the data 404 was received without failover or other adverse event over a preferred communication channel, the confidence score may be increased. Stated differently, a confidence score may be associated with the communication channel and may be added to the overall confidence score of the data 404. If the data 404 was not received over a preferred communication channel, or if failover occurred during transmission, or of the ISP 416a lacks characteristics of the ISP 416b, the confidence score may be decreased or not changed.

The data 404 may be delivered to the application 418 and the application 418 can access the confidence information 412c, which includes the confidence information associated with the data 404 as the data 404 traversed the DCF, from a ledger 414 or other storage location. The application 418 can view the overall confidence score and/or information (e.g., annotations) related to the confidence information associated specifically with the communication channels 416.

The application 418 may require certain transmission characteristics. If the data 404 is not delivered timely or transmitted using certain characteristics or protocols, the data 404 may not be useful or trusted by the application 418. The confidence information 412c allows the application 418 to determine how to trust the data 404. For example, the annotations and confidence score in the confidence information 412c allows the application 418 to determine whether to use, rely on, or ignore the data 404.

In addition, the confidence information 412c, which includes or reflects the ISP connection used for transmission, whether failover occurred, whether packet loss occurred, characteristics of the ISP over which transmission was successful, and other characteristics, allows ISP operations and selections to be audited because the confidence information in the ledger 414 allows a history or audit trail to be generated or created.

Figure 5:
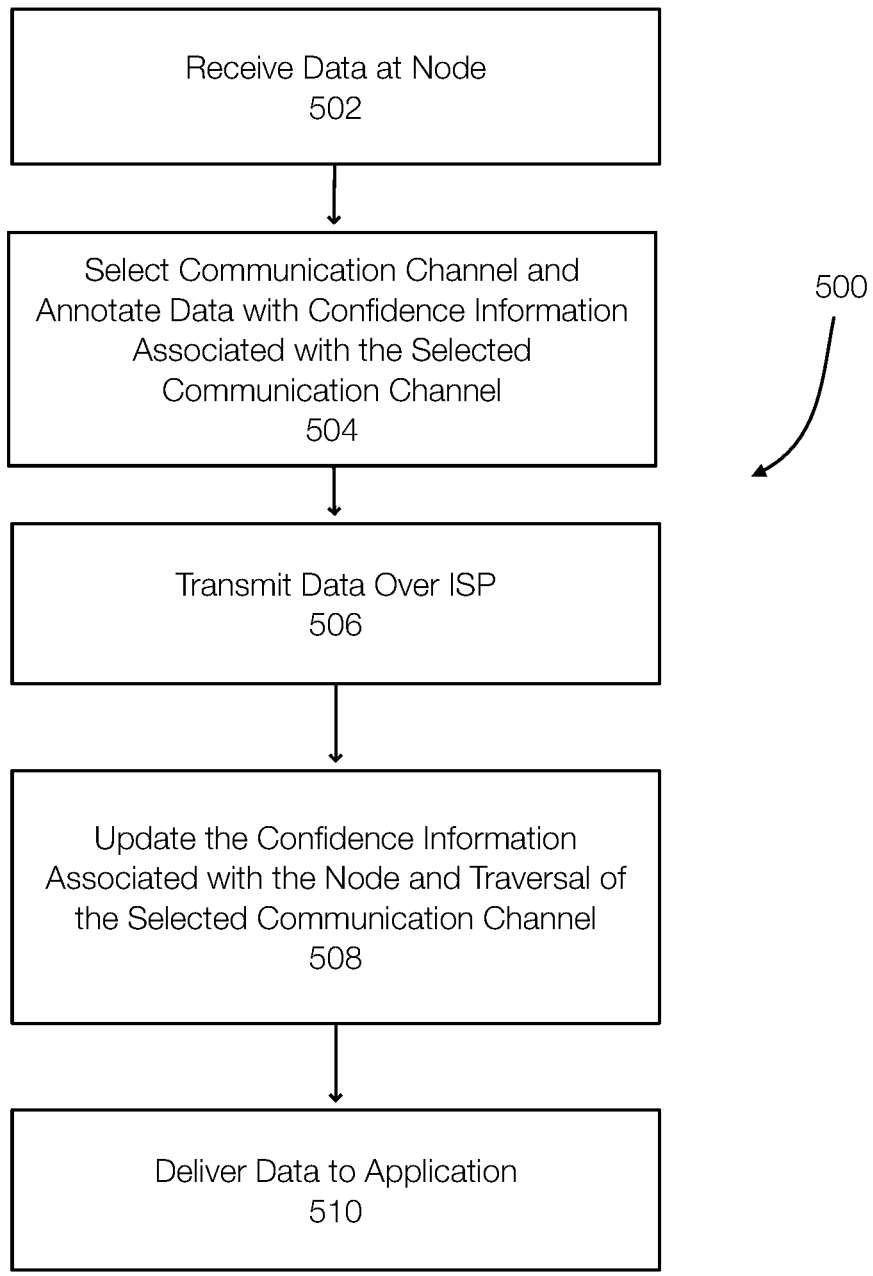
FIG. 5 discloses aspects of a method for generating confidence information based on communication channels used to transmit data.

FIG. 5 discloses aspects of a method of generating data confidence information and confidence scores that reflect the communication channel used to transmit the data. The method 500 includes receiving 502 data from a sensor or other device (e.g., an Internet of Things device).

A communication channel (e.g., an ISP) is selected 504 at the node. The selection may be made by default, based on data type, based on the application, or the like. The confidence information may relate to the ISP selection, characteristics of the ISP, or the like. The confidence information may also include other annotations related to the capabilities of the node such as TSL (Transport Layer Security) or TPM (Trusted Platform Module) in the context of TSN transmission.

Once the annotation related to the communication channel is generated, the data is transmitted 506 over the selected communication channel. If failover or other event occurs, the failover or event is added to the confidence information as an annotation. This may allow an application to determine that some portions of data were received over a first ISP and other portions of the data were received over a second ISP and to understand why the communication channel changed.

At the next node or at a destination node, the confidence information may be updated 508 or augmented again. For example, the confidence information may be updated to reflect that the data was received over the originally selected ISP, that failover occurred, that packet loss occurred, or the like. When transmission is successful, updating the confidence information may include increasing the data's confidence score.

The data may be delivered 510 to an application that may access or use the confidence information when determining how or whether to use the data. Accessing the data by the application may include an evaluation of the confidence score and/or confidence information. Embodiments of the invention relate to measuring confidence based on communication channel considerations.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data network operations, routing operations, forwarding operations, route selection operations, confidence information generation/storing operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter or other environment.

Example cloud computing environments, which may or may not be public, include storage environments that may provide services/functions for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, servers, and the like, for example, may likewise take the form of software, physical machines, containers, or virtual machines (VMs), though no particular component implementation is required for any embodiment.

As used herein, the term 'data' is intended to be broad in scope. Thus, that term embraces, by way of example and not limitation, data produced in computing environments, by far edge nodes, sensors, user devices, or the like. Data may include time series data and may have various formats and structures.

It is noted that any operation(s) of any of methods discloses herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving data at a node of a data confidence fabric, wherein the node is configured to transmit the data to a second node using multiple communication channels, selecting a first communication channel for transmitting the data, generating confidence information for the data at the node, wherein the confidence information includes a first annotation related to transmitting the data in the data confidence fabric over the first communication channel, transmitting the data to the second node in the data confidence fabric, generating second confidence information at the second node, wherein the second confidence information includes a second annotation related to receiving the data at the second node, and storing the first confidence information and the second confidence information in a ledger, wherein the data is associated with a confidence score that accounts for transmission of the data over the first communication channel.

Embodiment 2. The method of embodiment 1, further comprising transmitting the data to the second node over the first communication channel, wherein the first annotation generated at the node verifies that the data was sent using the first communication channel and reflects trust characteristics of the first communication channel.

Embodiment 3. The method of embodiment 1 and/or 2, further comprising failing over from the first communication channel to the second communication channel.

Embodiment 4. The method of embodiment 1, 2, and/or 3, further comprising updating the first annotation to reflect the failover to the second communication channel.

Embodiment 5. The method of embodiment 1, 2, 3, and/or 4, further comprising the second node updating the second annotation to reflect that the data was received over the second communication channel and/or the failover.

Embodiment 6. The method of embodiment 1, 2, 3, 4, and/or 5, wherein the first communication channel comprises an ISP connection and the second communication channel comprises an ISP connection.

Embodiment 7. The method of embodiment 1, 2, 3, 4, 5, and/or 6, further comprising generating a confidence score for the data, wherein the confidence score accounts for the failover or accounts for no failover when transmitting the data.

Embodiment 8. The method of embodiment 1, 2, 3, 4, 5, 6, and/or 7, wherein the second node comprises an application or a software as a service (Saas).

Embodiment 9. The method of embodiment 1, 2, 3, 4, 5, 6, 7, and/or 8, wherein the first annotation and/or the second annotation reflect trust characteristics of the communication channel used to transmit the data.

Embodiment 10. The method of embodiment 1, 2, 3, 4, 5, 6, 7, 8, and/or 9, further comprising adjusting the confidence score at the first node and at the second node.

Embodiment 11 A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
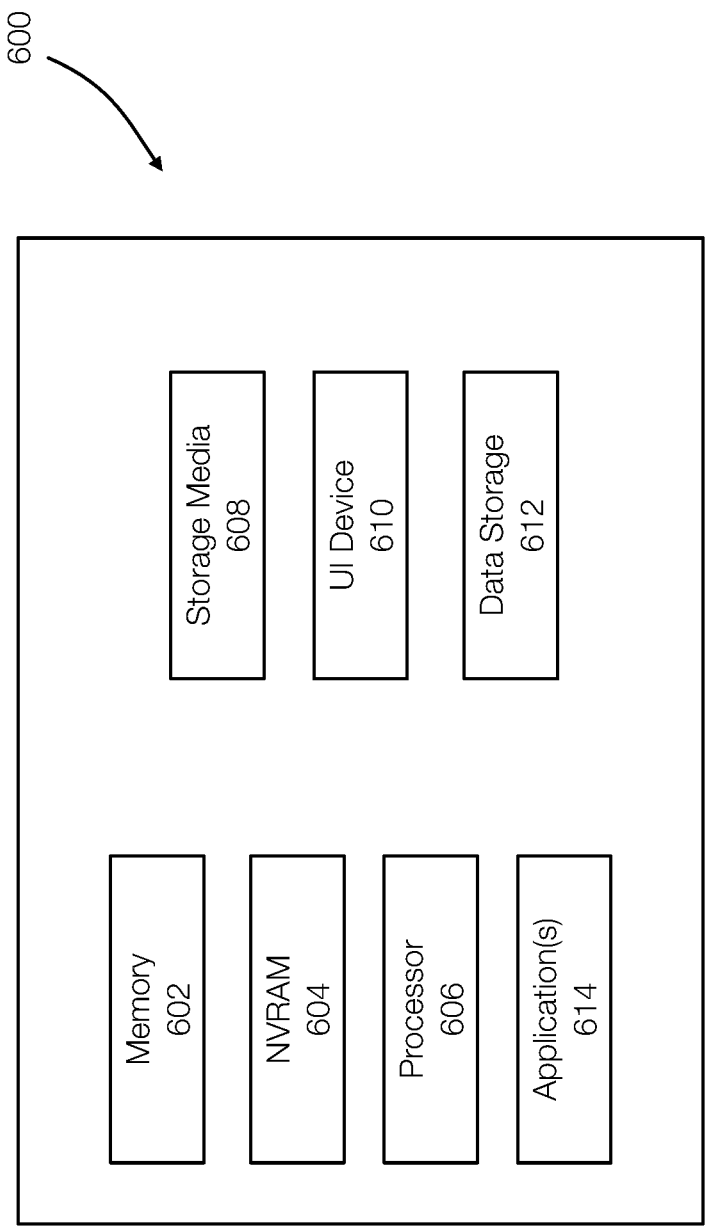
FIG. 6 discloses aspects of a computing device, system, or entity.

With reference briefly now to FIG. 6, any one or more of the entities disclosed, or implied, by the Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    receiving data at a first node of a data confidence fabric, wherein the first node is configured to transmit the data to a second node using multiple communication channels;
    selecting, via a routing engine, a first communication channel for transmitting the data and identifying, via the routing engine, a second communication channel;
    generating, via a data confidence fabric engine, first confidence information for the data at the first node, wherein the first confidence information includes a first annotation related to transmitting the data in the data confidence fabric over the first communication channel and based on a confidence in the first communication channel during data transmission;
    transmitting the data over the first communication channel to the second node in the data confidence fabric;
    in response to the routing engine detecting a packet loss on the first communication channel, transmitting the data to the second node over the second communication channel and updating the first annotation to indicate the packet loss and failover event;
    generating, via the data confidence fabric engine, second confidence information at the second node, wherein the second confidence information includes a second annotation related to receiving the data at the second node via the second communication channel after failover; and
    storing the first confidence information and the second confidence information in a ledger, wherein the data is associated with a confidence score that accounts for transmission of the data over the first communication channel and any packet loss or failover events.

2. The method of claim 1, further comprising transmitting the data to the second node over the first communication channel, wherein the first annotation generated at the node verifies that the data was sent using the first communication channel and reflects trust characteristics of the first communication channel.

3. The method of claim 1, further comprising failing over from the first communication channel to the second communication channel during a failover.

4. The method of claim 3, further comprising updating the first annotation to reflect the failover to the second communication channel.

5. The method of claim 4, further comprising the second node updating the second annotation to reflect that the data was received over the second communication channel and/or the failover.

6. The method of claim 5, wherein the first communication channel comprises an ISP connection and the second communication channel comprises an ISP connection.

7. The method of claim 5, further comprising generating a confidence score for the data, wherein the confidence score accounts for the failover or accounts for no failover when transmitting the data.

8. The method of claim 5, wherein the second node comprises an application or a software as a service (Saas).

9. The method of claim 1, wherein the first annotation and/or the second annotation reflect trust characteristics of the communication channel used to transmit the data.

10. The method of claim 1, further comprising adjusting the confidence score at the first node and at the second node, wherein the confidence of the first communication channel and a confidence of a second communication channel in an event of failover includes a selection, performance, an operation of the first and second communication channels.

11. A non-transitory storage medium having stored therein instructions that are executable by one or more hardware processors to perform operations comprising:
    receiving data at a first node of a data confidence fabric, wherein the first node is configured to transmit the data to a second node using multiple communication channels;
    selecting, via a routing engine, a first communication channel for transmitting the data and identifying, via the routing engine, a second communication channel;
    generating, via a data confidence fabric engine, first confidence information for the data at the first node, wherein the first confidence information includes a first annotation related to transmitting the data in the data confidence fabric over the first communication channel and based on a confidence in the first communication channel during data transmission;
    transmitting the data over the first communication channel to the second node in the data confidence fabric;
    in response to the routing engine detecting a packet loss on the first communication channel, transmitting the data to the second node over the second communication channel and updating the first annotation to indicate the packet loss and failover event;
    generating, via the data confidence fabric engine, second confidence information at the second node, wherein the second confidence information includes a second annotation related to receiving the data at the second node via the second communication channel after failover; and
    storing the first confidence information and the second confidence information in a ledger, wherein the data is associated with a confidence score that accounts for transmission of the data over the first communication channel and any packet loss or failover events.

12. The non-transitory storage medium of claim 11, further comprising transmitting the data to the second node over the first communication channel, wherein the first annotation generated at the node verifies that the data was sent using the first communication channel and reflects trust characteristics of the first communication channel.

13. The non-transitory storage medium of claim 11, further comprising failing over from the first communication channel to the second communication channel during a failover.

14. The non-transitory storage medium of claim 13, further comprising updating the first annotation to reflect the failover to the second communication channel.

15. The non-transitory storage medium of claim 14, further comprising the second node updating the second annotation to reflect that the data was received over the second communication channel and/or the failover.

16. The non-transitory storage medium of claim 15, wherein the first communication channel comprises an ISP connection and the second communication channel comprises an ISP connection.

17. The non-transitory storage medium of claim 15, further comprising generating a confidence score for the data, wherein the confidence score accounts for the failover or accounts for no failover when transmitting the data.

18. The non-transitory storage medium of claim 15, wherein the second node comprises an application or a software as a service (Saas).

19. The non-transitory storage medium of claim 11, wherein the first annotation and/or the second annotation reflect trust characteristics of the communication channel used to transmit the data.

20. The non-transitory storage medium of claim 11, further comprising adjusting the confidence score at the first node and at the second node, wherein the confidence of the first communication channel and a confidence of a second communication channel in an event of failover includes a selection, performance, an operation of the first and second communication channels.

* * * * *